Nov. 14, 1939.                H. H. ROLLINS                2,180,257
                              HITCH DEVICE
                           Filed Jan. 5, 1939
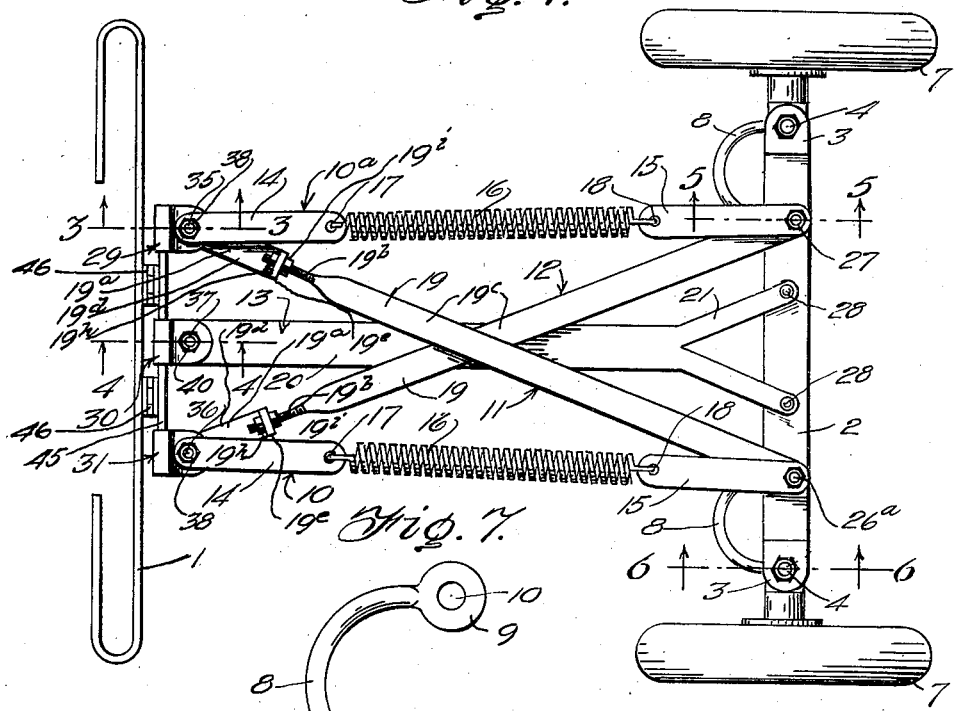
Inventor
HENRY H. ROLLINS,
By Kimmel & Crowell,
Attorneys Patented Nov. 14, 1939

2,180,257

UNITED STATES PATENT OFFICE 2,180,257

HITCH DEVICE

Henry H. Rollins, Phoenix, Ariz.

Application January 5, 1939, Serial No. 249,491

5 Claims. (Cl. 280—33.55)

This invention relates to a hitch device designed primarily for a two wheel trailer, but it is to be understood that a hitch device in accordance with this invention is for use in any connection for which it may be found applicable.

The invention has for its object to provide, in a manner as hereinafter set forth, a hitch device so constructed and so arranged in relation to the rear bumper of a car or truck and the axle of the trailer whereby when the car or truck is backed in any direction, the trailer will be caused to move in a line corresponding to the line of movement of the car or truck.

Further objects of the invention are to provide, in a manner as hereinafter set forth, a hitch device which is simple in its construction, strong, durable, compact, readily installed, thoroughly efficient in its use, conveniently assembled and comparatively inexpensive to manufacture.

Embodying the objects aforesaid and to others which may hereinafter appear, the invention consists of the novel construction, combination and arrangement of parts as will be more specifically described and illustrated in the accompanying drawing, wherein is shown an embodiment of the invention, but it is to be understood that changes, variations and modifications may be resorted to which fall within the scope of the invention as claimed.

In the drawing:

Figure 1 is a bottom plan view of the hitching device as installed with respect to the axle of a trailer and the rear bumper of an automotive vehicle, Figure 2 is a side elevation of the structure shown in Figure 1, Figures 3, 4, 5 and 6 are respectively sections on lines 3—3, 4—4, 5—5 and 6—6 of Figure 1, and Figure 7 is a top plan view of the form of the steering arms employed.

With reference to the drawing 1 designates the rear bumper of an automobile vehicle, such as an automobile or a truck and 2 indicates the axle of the trailer. The axle 2 at each end if formed with a knuckle 3 to which is pivotally connected by the pivot bolt 4, the inner vertically disposed tubular end 5, of a spindle 6 upon which a trailer wheel 7 is revolubly mounted on and connected to. The inner tubular end 5 of the spindle 6 has formed integral therewith, intermediate its ends, the outer end of a forwardly directed horizontally disposed steering arm 8 of semi-ovoidal contour having a flattened inner end terminal portion 9 apertured, as at 10 and offset with respect to that portion of the arm 8 with which it is integral. The portion 9 of the arm 8 is suspended below the axle 2 inwardly adjacent the closed side of a knuckle 3 by means to be referred to.

The hitching device is to be connected to the axle 2 and the bumper 1, and it not only includes the arms 8, but also a pair of spaced parallel resilient coupling elements 10, 10ª, of like form, a pair of oppositely disposed non-resilient lengthwise adjustable combined equalizers and coupling elements 11, 12 of like form and a non-resilient combined pusher and draw bar element 13.

The element 10, as well as the element 10ª, consists of a front and a rear link 14, 15 respectively and a coiled tensioning spring 16 arranged between the links 14, 15. The forward end of spring 16 is connected, as at 17 to the rear end of link 14. The rear end of spring 16 is connected, as at 18 to the forward end of link 15. The links 14, 15 may be round or flat and are shown by way of example as flat.

The element 11, as well as the element 12, is formed of a rear and a forward section 19, 19ª respectively. The section 19 is of greater length than section 19ª. The section 19 consists of a peripherally threaded leading portion 19ᵇ of circular cross section and a follower portion 19ᶜ of greater length than portion 19ᵇ. The portion 19ᶜ may be of any suitable cross section, preferably rectangular and it is so shown. The portion 19ᶜ is of greater width than the diameter of portion 19ᵇ. The section 19ª is of angle form and includes a horizontal leg 19ᵈ merging at its rear end into an upstanding apertured leg 19ᵉ. The portion 19ᵇ of section 19 extends through the apertured leg 19ᵉ of the section 19ª. The portion 19ᵇ carries an adjusting nut 19ᵇ which is to bear against the forward face of leg 19ᵉ, and a lock nut 19ⁱ which is to bear against the rear face of leg 19ᵉ. This arrangement provides for adjusting the length of an element 11 or 12 and for locking it in its adjusted position.

The pusher element 13 consists of a bar 20 having a V-shaped rear end terminal portion 21. The element 13 may be round or flat and is shown by way of example as flat. The bar 13 is of greater thickness than the links 14, 15 and the bars 19.

The links 14 have openings 22 at their forward ends. The links 15 have openings 23 at their rear ends. The sections 19ª of elements 11, 12 have openings 24 at their forward ends and the sections 19 of elements 11, 12 have openings 25 at their rear ends. The bar 20 has an opening 26 at its forward end. The elements 9, 10 are arranged below the elements 11, 12. The opening 22 in the forward end of element 9 aligns with the opening 24 in the forward end of the section 19a of element 12. The opening 22 in the forward end of element 10 aligns with the opening 24 in the forward end of the section 19a of element 11. The arms 8 are arranged above the rear ends of the elements 9, 10, 11 and 12. The opening 10 of an arm 8 aligns with the opening 23 of element 9 and the opening 25 in the section 19 of element 11. The opening 10 of the other arm 8 aligns with the opening 23 of element 10 and the opening 25 in the section 19 of element 12. The inner end of an arm 8, rear end of element 9 and rear end of section 19 of element 11 are pivotally connected together, as at 26a. The inner end of the other arm 8, rear end of element 10 and rear end of section 19 of element 12 are pivotally connected together, as at 27. The rear end terminal portion 21 of the element 13 extends to a point below the axle 2 and is fixedly secured against the lower face of the axle 2 by the holdfast means 28.

The device includes a set of split couplers, three in number and indicated at 29, 30, and 31. These couplers are of like form and disposed in parallel spaced relation with respect to the rear bumper 1. These couplings are formed from a metallic strap bent in a manner to provide a vertically disposed split hollow head 32 of rectangular contour in vertical section and a two-part rearwardly extending stem 33. The parts of the latter are disposed in superposed spaced relation, are formed with aligned openings 34 and have their inner faces flush with the edges of the split of the head. The space between the parts of the stem of coupler 30 is of greater width than the space between the parts of the stems of the couplers 29, 31. The coupler 30 is arranged between the couplers 29, 30 and spaced therefrom. The stems of the couplers extend rearwardly. The coupler 29 is employed in connection with the elements 10 and 11. The coupler 30 is employed in connection with the element 13 and the coupler 31 is employed in connection with the elements 9 and 12.

The forward end of the section 19a of element 12 is arranged between the parts of the stem of couplers 29. The forward end of the link 14 of element 10a is positioned against the lower face of the stem of coupler 29. The openings on the forward ends of the elements 10a, 12 align with the openings in the stem of coupler 29, and the said forward ends of the elements 10a, 12 are pivotally attached to the stem of coupler 29 by a means 35 which extends through said aligning openings and connected to the stem of coupler 29. The forward end of the section 19a of element 11 is arranged between the parts of the stem of coupler 31. The forward end of the link 14 of element 10 is positioned against the lower face of the stem of coupler 31. The openings at the forward ends of the elements 10, 11 align with the openings in the stem of coupler 31, and the said forward ends of the elements 10, 11 are pivotally attached to the stem of coupler 31 by a means 36 which extends through such aligning openings and is connected to the stem of coupler 31. The forward end of element 13 is positioned between the parts of the stem of coupler 30 and has its opening 26 align with the openings in such stem, and the said forward end of element 13 is pivotally attached to the stem of coupler 30 by a means 17 which extends through such aligning openings and is connected to the stem of coupler 30.

The means 35 and 36 are of like form and each consists of a headed bolt 38 and a clamping nut 39 as shown in Figure 3 with respect to the coupler 39. The means 37 with reference to Figure 4 consists of a headed bolt 40 and a clamping nut 41.

The means 26a and the means 27 are of like form and each consists with reference to Figure 5 of a headed bolt 42 and a clamping nut 43.

Extending through the heads of the couplers 29, 30, and 31 is a carrier 45 in the form of a rectangular plate standing disposed on its lower lengthwise edge and snugly engaging throughout the inner faces of said heads. The carrier 45 will be suitably secured to the heads of the couplers, preferably by welding. The ends of the carrier 45 are flush with the outer side surfaces of the couplers 29, 31. The couplers 29, 31, and 30 are equally spaced from each other, and secured to the forward face of the carrier 45 between the couplers and to the rear face of the bumper 1 is a pair of spaced connectors 46, each in the form of a hinge. Preferably the forward sections or leaves of the connectors will be welded to bumper 1 and the rear sections or leaves of the connectors will be welded to the carrier. The pivots of the connectors are disposed at the upper ends of the sections or leaves thereof. The connectors disposed the bumper 1 in spaced relation to the couplers 29, 31.

The hitching device when constructed in the manner as shown and installed with respect to the bumper 1 and axle 2 provides when the automotive vehicle is backed in any direction for the trailer to follow the line of movement of the vehicle.

To understand this let it be supposed that the automobile to which the bumper 1 is attached has its steering wheels turned to the left and is backing. This will tend to swing the bumper clockwise on the pivot 37. As the bumper moves clockwise pressure is exerted on the member 11 which acts at the joint 26a to swing the element 8 attached at that joint also in a clockwise direction which thus swings the corresponding wheel 7 in a clockwise direction. Likewise tension is exerted on the element 12 which similarly effects turning of the remaining wheel 7 in a clockwise direction. Thus the automobile steering wheels and the trailer wheels will be inclined in opposite directions and both automobile and trailer will move in the same circular arc. Under the normal rectilinear travelling movement the springs 16 hold the wheels straight.

What I claim is:

1. A hitching device for a trailer comprising a pair of steering arms, each adapted to have one end connected with a wheel of the trailer, a non-resilient draw-bar element adapted to have its rear end fixed to the axle of the trailer, a pair of spaced parallel resilient coupling elements, a pair of adjustable coupling elements, spaced means for pivotally supporting corresponding ends of the pairs of coupling elements and the other end of the draw-bar element, a carried for coupling said spaced means together, means for hinging the carrier to a traction device, and means for pivotally connecting the other ends of the pairs of coupling elements to the other ends of said arms.

2. A hitching device for a trailer comprising a pair of steering arms, each adapted to have one end connected with a wheel of the trailer, a non-resilient draw-bar element adapted to have its rear end fixed to the axle of the trailer, a pair of spaced parallel resilient coupling elements, a pair of adjustable coupling elements, spaced means for pivotally supporting corresponding ends of the pairs of coupling elements and the other end of the draw-bar element, a carrier for coupling said spaced means together, means for hinging the carrier to a traction device, and means for pivotally connecting the other ends of the pairs of coupling elements to the other ends of said arms, the said pair of adjustable coupling elements extending at opposite inclinations across each other.

3. A hitching device for a trailer comprising a pair of forwardly directed curved steering arms adapted to have their outer ends connected with a pair of wheels of the trailer, a pair of resilient and a pair of adjustable coupling elements, means for pivotally connecting the rear ends of said elements to the inner ends of said arms, a combined pusher and draw-bar fixedly secured at its rear end to the axle of the trailer, a structure for coupling together and for pivotally supporting the forward ends of the said pairs of elements and the other end of said drawbar, and means for hinging said structure to a traction device.

4. A hitching device for a trailer comprising a pair of forwardly directed curved steering arms adapted to have their outer ends connected with a pair of wheels of the trailer, a pair of resilient and a pair of non-resilient coupling elements, means for pivotally connecting the rear ends of said elements to the inner ends of said arms, a combined pusher and draw-bar element fixedly secured at its rear end to the axle of the trailer, a structure for coupling together and pivotally supporting the forward ends of the said pairs of elements and the other end of said drawbar with a traction device, means for connecting said structure to a traction device, the resilient coupling elements being disposed in parallel spaced relation, the non-resilient coupling elements extending at opposite inclinations, across each other and across said combined pusher and draw-bar element, the latter being arranged between the said pair of resilient coupling elements, and the ends of the non-resilient coupling elements being aligned with the ends of the resilient coupling elements.

5. A hitching device for trailers comprising a pair of spaced steering arms for connection at one end with the trailer, a pair of forwardly extending spaced resilient coupling elements, a pair of forwardly extending non-resilient oppositely inclined combined equalizers and coupling elements, means for pivotally connecting the rear ends of the elements of the said pairs of elements to the other ends of said arms, a combined pusher and draw-bar element adapted to have its rear end fixed to the trailer, spaced couplers, means for pivotally connecting the forward ends of all of the said elements to said couplers, a carrier connecting said couplers in spaced sidewise opposed parallel relation, and means secured to the carrier for connecting the latter to a traction device.

HENRY H. ROLLINS.